June 13, 1933. F. LUTZ 1,913,493
LURE
Filed Feb. 23, 1932
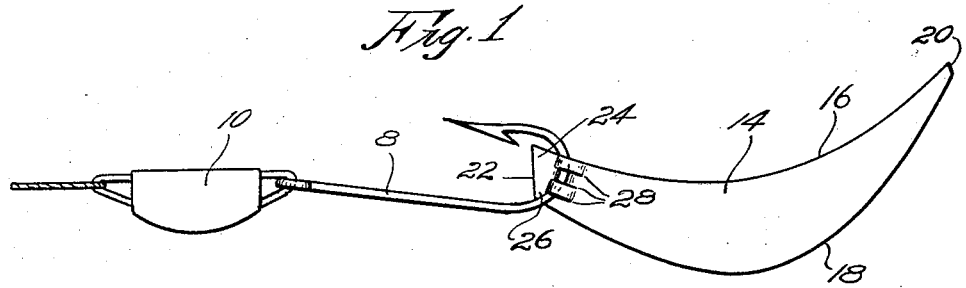
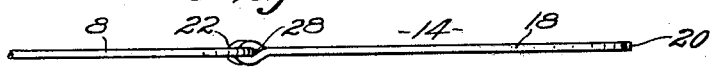
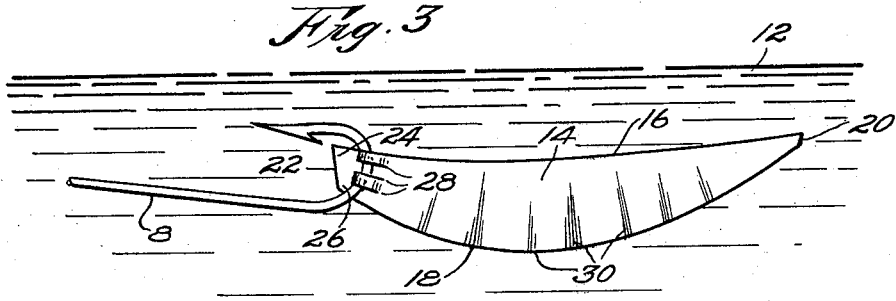
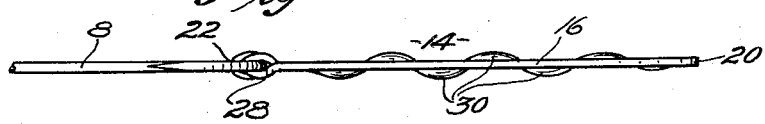
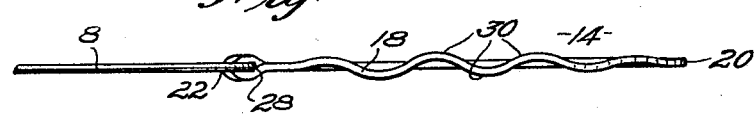
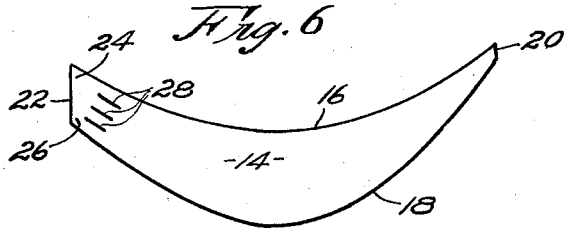
INVENTOR,
Frank Lutz.
BY
Hovey & Hamilton
ATTORNEYS.

Patented June 13, 1933

1,913,493

UNITED STATES PATENT OFFICE

FRANK LUTZ, OF KANSAS CITY, MISSOURI

LURE

Application filed February 23, 1932. Serial No. 594,424.

This invention relates to a fish lure and has for its primary object the provision of a new article of manufacture formed in a particular manner to produce a result which renders the same highly effective when used as and for the purpose specified.

One of the prime objects of this invention is the contemplation of a lure produced from rind, such as the hide of a hog, and cut to present a thin, flexible body, the two opposing longitudinal sides thereof being formed to coact when the lure is in use to impart motion to the body of the lure that will attract and hold the attention of the fish.

A yet further object of this invention is to provide a lure comprising a thin body of flexible material that is cut to a particular pattern to present a shape which will be altered when the lure is in use to the extent of imparting action to the body of the lure of a character sufficient to set up an attraction.

An even further object of this invention is the provision of a lure of the character mentioned which is strong and durable enough to permit of using the same many times, and to preclude its being torn from the hook when drawn through the water.

Many minor objects of the invention will appear during the course of the detailed specification, referring to the accompanying drawing, wherein:

Figure 1 is a side elevation of a lure made in accordance with this invention and associated with a fish hook.

Fig. 2 is an edge elevation of the lure and a portion of the hook.

Fig. 3 is a view similar to that of Fig. 1, but showing the lure changed in form as a result of the action of the water thereon.

Fig. 4 is a top edge view of the lure in the condition illustrated in Fig. 3.

Fig. 5 is a bottom edge view of the same, and,

Fig. 6 is a side elevation of the lure showing the same as it appears when ready for attachment to the fish hook.

In referring to the lure it will be understood that the same is associated with an ordinary fish hook 8, with which is combined a weight or similar element 10 for the purpose of maintaining hook 8 and the hereinafter described lure beneath surface 12 of the water.

The lure itself may be formed from pork and especially the hide of the hog which may be cut thin enough to lend great flexibility to the body of the lure and will yet be sufficiently strong to preclude tearing or other destructive actions when the lure is being handled or as it is being subjected to hard usage.

A lure created in accordance with this invention should include a body 14, thin enough to permit flexing and of a size commensurate with the requirements of the hook used and fish sought. Body 14 should be substantially uniform in thickness and one of its longitudinal edges 16 is arched inwardly of body 14 while the opposite longitudinal edge 18 is arched outwardly more acutely or at a greater degree of curvature than that of edge 16. The convexo-concave effect created is clearly illustrated in Figs. 1 and 6, and such relation and formation of longitudinal edges 16 and 18 requires that end 20 be substantially narrower than the opposite end 22. Since the force of the water against body 14 is to be utilized to create a movement on the part of body 14, it is desirable to cut the same at end 22, whereby to create an acute angle 24 between end 22 and side 16. The angle 26, which is formed between end 22 and side 18, is an obtuse angle and it is adjacent this end 22 that the series of slits 28 are formed through body 14. These slits 28 should extend substantially parallel to the sides 16 and 18 at that particular location which causes the relative angle between end 22 and slits 28 to be set up as shown in Figs. 1 and 6.

This particular disposition of slits 28 and the relation thereto of the sides and end 16, 18 and 22 respectively contributes to the action set up when body 14 is drawn through the water beneath surface 12 thereof.

Assuming that hook 8 is properly inserted through slits 28 and body 14, hook 8 and weight 10 are beneath surface 12 of the water and, assuming all of said elements are being drawn through the water at the speed usually utilized when casting or trolling, there will be created along edge 18 of body 14, a succession of transverse undulations 30, such as are illustrated in Figs. 3, 4 and 5.

The force of the water against that portion of longitudinal edge 18 against end 20 will tend to straighten out arcuate edge 16 and thereby create a fullness in body 14 along edge 18. This fullness varies in degree from the center, where it is greater, toward the ends, where it gradually fades out, all due to the greater width of body 14 intermediate the ends thereof. These transverse undulations or waves 30 will set up vibration and movement in body 14 as it is carried along in much the same manner as the art has heretofore known such movement because of the action of a spoon. It is notable that this lure, formed as contemplated by the invention, is effective and even more attractive to the fish than have been the lures heretofore actuated through the use of a spoon or similar devices carried ahead of the lure to churn or create an agitation in the water. The very slightest travel on the part of body 14 with end 22 disposed forwardly, will "animate" body 14 to a degree where it practically takes the place of line bait.

Slight variations in the degree of arcuateness or relation of the specific parts herein described will likewise vary the action on the part of the lure and while such variation might be practiced, it is understood that the same falls within the concepts of the broad invention and does not depart from the scope of the appended claims.

Having thus described the invention, what is claimed as new and desired to be secured by Letters Patent is:

1. A lure comprising a thin flexible body of rind having one longitudinal edge convex and the opposite longitudinal edge concave, the degree of curvature of said longitudinal edges being different whereby to create a greater width to said body intermediate the ends than at the ends thereof.

2. A lure comprising a flexible body of substantially uniform thickness having arcuate longitudinal edges to form a body having one longitudinal edge convex throughout its length and the other longitudinal edge concave throughout its length.

3. A lure comprising a flexible body of substantially uniform thickness having a convex and a concave longitudinal edge, the width of one end of said body being greater than the other, the end of greatest width forming an acute angle at its juncture with the concave edge and an obtuse angle at its juncture with the convex edge.

4. A rind lure comprising a flexible body having a longitudinal edge concave throughout its length, a longitudinal edge convex throughout its length and means at one end of the body for securing the same to a hook with the major plane thereof in the same plane as said hook.

5. A rind lure comprising a flexible body having a concave longitudinal edge, a convex longitudinal edge and means for securing one end of the body to a hook, said concave edge being adapted to cause the body to have undulations along the said convex edge when the lure is pulled through the water.

In testimony whereof, I hereunto affix my signature.

FRANK LUTZ.